Sept. 28, 1971   T. R. GIBBON ET AL   3,608,421
MANUFACTURE OF ROD-LIKE ARTICLES HAVING
CORES OF FLUENT MATERIALS
Filed Oct. 11, 1968

INVENTORS
TREVOR REX GIBBON
STEPHEN WALTERS KOTZE
By Cushman, Darby & Cushman
ATTORNEYS 3,608,421
MANUFACTURE OF ROD-LIKE ARTICLES HAVING CORES OF FLUENT MATERIALS
Trevor Rex Gibbon, Northrand, Transvaal, and Stephen Walters Kotze, Johannesburg, Transvaal, Republic of South Africa, assignors to African Explosives and Chemical Industries Limited, Johannesburg, Transvaal, Republic of South Africa
Filed Oct. 11, 1968, Ser. No. 766,810
Claims priority, application Republic of South Africa, Oct. 12, 1967, 67/6,088
Int. Cl. F42b 33/02; C06b 21/02
U.S. Cl. 86—1
13 Claims

ABSTRACT OF THE DISCLOSURE

Apparatus for manufacturing a rod-like article having a flexible tubular casing and a core of fluent material, the apparatus comprising a mandril and a first die aligned and spaced apart therefrom so as to define an annular passage therewith for forming a strip of flexible material into a tubular casing, the mandril being adapted to permit a fluent material to be fed into the tubular casing, a second die having an opening of cross-sectional area smaller than that of the first die and in alignment with the opening of the first die so as to permit the tubular casing to be displaced through the dies, and means for adjusting the spacing between the die openings; a method for manufacturing rod-like articles having a flexible tubular casing and a core of fluent material, using this apparatus is also disclosed.

---

This invention relates to improvements in or relating to the manufacture of rod-like articles having cores of fluent materials. More particularly, the invention relates to an improved method and apparatus for filling a tubular casing with a core of a fluent material.

A problem which is often encountered in the filling of a tubular casing with a core of a fluent material such as an explosive or combustible powder, is that a variation in the physical characteristics, such as the density of the fluent material, causes a similar variation in the physical characteristics, e.g. the weight per unit length, of the finished rod-like article. This is often undesirable when it is necessary that the physical characteristics of the finished article should be uniform.

The method and means at present known to the applicant for adjusting the weight per unit length of articles of the kind referred to, involve a laborious procedure requiring a prolonged interruption in manufacture.

It is an object of this invention to provide a method and means in the manufacture of a rod-like article having a core of a fluent material to facilitate the adjustment of the weight per unit length of the core.

According to the invention an apparatus for manufacturing a rod-like article having a tubular casing and a core of a fluent material, includes means for defining a first die opening, means for defining a second die opening aligned with and spaced from the first die opening, the die openings being adapted to permit a tubular casing to be displaced therethrough, and means for adjusting the spacing between the openings.

In this specification the expressions "rod" and "rod-like" are intended to include rigid as well as flexible articles.

The means for adjusting the spacing between the die openings may include a helical formation. Furthermore, there may be provided secondary formations on the helical formation and spaced helically along it. There may further be provided lug-like formations adapted to engage the secondary formations.

Conveniently, the helical formation may be provided on the means defining one of the die openings and the lug-like formations may be provided on the means defining the other die opening.

The apparatus may include a mandril for forming a strip of a flexible material into a tubular casing. Conveniently the mandril is of a tapering tubular form and is adapted to feed a fluent material into the tubular casing.

In one particular form of the invention, the means for defining the first die opening includes an inner die, and the means for defining the second die opening includes an outer die having a bore in which the inner die is receivable, the bore terminating in the second die opening. At least a part of the bore of the outer die may taper axially.

If desired, the inner die may have a bore of which at least a part thereof tapers axially.

Further according to the invention, in the manufacture of a rod-like article including a flexible tubular casing and a core of a fluent material, there is provided a method of filling the casing with a fluent material which includes the steps of displacing the casing through at least two aligned and spaced die openings and adjusting the spacing between the openings.

The method may include the further step of forming the tubular casing from a strip of a flexible material before it is displaced through the die openings.

The invention extends also to rod-like articles manufactured in accordance with or by means of the method or apparatus of the invention.

The method and apparatus in accordance with the invention may be used in the manufacture of fuses and/or detonating cords for explosives. Accordingly, the rod-like articles may be fuses and/or detonating cords for explosives. Thus, the core of fluent material may be a powder of a combustible or an explosive material, and the tubular casing may be of a flexible cellulosic material, such as paper.

The invention is described below with reference to the accompanying drawings in which.

Figure 1:
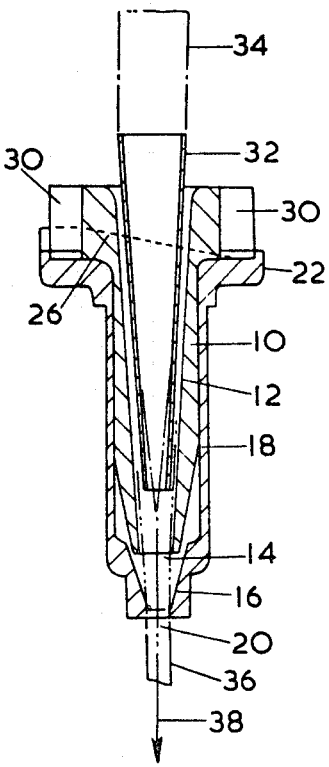
FIG. 1 shows an axial sectional view of an apparatus for manufacturing a rod-like article having a core of a fluent material.
Figure 2:
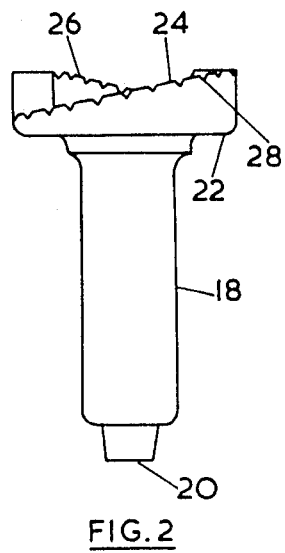
FIG. 2 shows a side view of the outer sheath part of the apparatus shown in FIG. 1.
Figure 3:
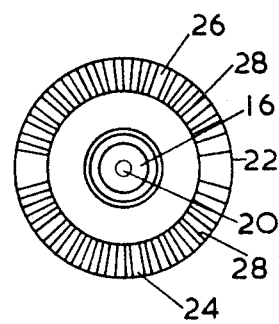
FIG. 3 shows a plan view of the sheath part shown in FIG. 2.

The drawing shows an axial sectional view of an apparatus in accordance with the invention for the manufacture of a rod-like article having a core of a fluent material.

Reference numeral 10 indicates an inner die having a tapering bore 12 and an outlet 14 forming a die opening. The inner die 10 is co-axial with the bore of an outer die 18. The portion 16 of the bore of the outer die tapers from a cross-sectional area larger than the cross-sectional area of the outlet 14, to an outlet 20 smaller than the outlet 14. The outlet 20 forms a further die opening and is aligned with and spaced from the outlet 14.

The outer die 18 has a collar 22 having two helical faces 24 and 26 on which are provided notches 28. The inner die 10 has two sideward projecting lugs 30 engaging the notches 28. By turning the lugs 30 to engage different notches 28, the relative axial positions of the inner die 10 and of the outer die 18 are adjusted, and thereby the spacing between the outlets 14 and 20 is varied.

In the bore 12 of the inner die 10 is provided a tapering tubular mandril 32. The mandril 32 is adapted to form a strip of a flexible material indicated in chain dot lines by reference numeral 34, e.g. of paper, into a tubular casing 36 when the strip is displaced through the clearance between the bore 12 of the inner die 10 and the mandril 32. The tapering mandril 32 is further adapted to serve as a funnel, through which a fluent material may be filled into the casing 36.

In use, the strip 34 is drawn in the direction of the arrow 38 through the clearance between the bore 12 of the inner die 10 and the mandril 32. Thereby a tubular casing 36 is formed. A fluent material, such as a powder which may be combustible or explosive, is filled through the mandril 32 into the casing 36. Since the outer die outlet 20 is smaller than the inner die outlet 14, the fluent material is compressed in the casing 36 as it is drawn through the outlet 20.

In order to vary the weight per unit length of the core of fluent material in the casing 36, the inner die 10 is turned relative to the outer die 18 so that the lugs 30 engage different notches 28. Thereby the inner die 10 is moved axially relative to the outer die 18, and the spacing between the inner die outlet 14 and the outer die outlet 20 is varied. As a result, the cross-sectional area of the tubular casing 36 is varied due to the flexing of the casing during filling and while the casing travels between the outlets 14 and 20. Thereby the volume of the casing 36 per unit length is varied, and consequently the weight per unit length of the core material.

The notches 28 are so calibrated that a particular calibration ensures a particular weight per unit length of the core of fluent material for a particular density of the fluent material. Thus, when the fluent material is produced batch-wise, the lugs 30 are set for each batch of a fluent material which is to be filled into the casing 36.

We claim:

1. Apparatus for manufacturing a rod-like article having a flexible tubular casing and a core of fluent material, said apparatus comprising a mandril and a first die aligned and spaced apart therefrom so as to define an annular passage therewith for forming a strip of flexible material into a tubular casing, the mandril being adapted to permit a fluent material to be fed into the tubular casing, a second die having an opening of cross-sectional area smaller than that of the first die and in spaced axial alignment with the opening of the first die so as to permit the tubular casing to be displaced through the dies, and means for adjusting the relative spacing between the die openings in an axial direction.

2. An apparatus as claimed in claim 1 wherein the means for adjusting the spacing between the die openings includes a cam face attached to one of the dies and a cam follower attached to the other die.

3. An apparatus as claimed in claim 2 wherein the cam face comprises a helical formation.

4. An apparatus as claimed in claim 2 wherein the cam follower comprises one or more lug-like formations.

5. An apparatus as claimed in claim 3 wherein the helical formation is formed with secondary formations and the cam follower comprises one or more lug-like formations adapted to engage with said secondary formations.

6. An apparatus as claimed in claim 1 wherein the second die has a bore in which the first die is receivable.

7. An apparatus as claimed in claim 1 wherein the first die has a bore in which the mandril is at least partly located.

8. An apparatus as claimed in claim 1 wherein the mandril is supported by the first die.

9. An apparatus as claimed in claim 1 wherein the mandril is of a tapering tubular form.

10. An apparatus as claimed in claim 1 wherein at least part of the bore of said first die adjacent to the die opening tapers axially.

11. An apparatus as claimed in claim 1 wherein at least part of the bore of said second die adjacent to the die opening tapers axially.

12. A method for the manufacture of a rod-like article having a flexible tubular casing and a core of fluent material, comprising continuously forming a flexible tubular casing from a strip of flexible material by passing a strip of flexible material through a passage defined between a mandril and a first die, thereby to form the strip into a tubular casing, feeding the fluent material into the newly formed casing, continuously displacing the filled casing through the opening of said first die and the opening of a second die aligned with and spaced from the first die, the opening of the second die being smaller in cross-sectional area than the opening of the first die and in spaced axial alignment with the opening of the first die so as to permit the tubular casing to be displaced through the dies, and adjusting the relative spacing between the openings of the dies in an axial direction to adjust the weight per unit length of the core.

13. A method as claimed in claim 12 wherein the rod-like article is a fuse or detonating cord.

References Cited

UNITED STATES PATENTS

| 3,312,766 | 4/1967 | Stevens | 156—244UX |
|-----------|--------|---------|-----------|
| 3,320,847 | 5/1967 | Kelly et al. | 86—20X |
| 3,411,399 | 11/1968 | Griffith | 86—1 |

FOREIGN PATENTS

| 1,105,552 | 12/1955 | France | 86—20 |

BENJAMIN A. BORCHELT, Primary Examiner

J. J. DEVITT, Assistant Examiner

U.S. Cl. X.R.

86—20; 264—3; 53—191